July 12, 1927.

R. GROVER

PISTON RING

Filed July 27, 1925

1,635,407

INVENTOR.
Ray Grover
BY Erwin Wheeler & Woolard
ATTORNEYS.

Patented July 12, 1927.

1,635,407

UNITED STATES PATENT OFFICE.

RAY GROVER, OF MILWAUKEE, WISCONSIN.

PISTON RING.

Original application filed February 27, 1922, Serial No. 539,487. Divided and this application filed July 27, 1925. Serial No. 46,290.

This invention relates to improvements in piston rings. The present application is a division of my application filed February 27, 1922, Serial Number 539,487 and relating to a method of manufacturing rings embodying the invention to be claimed herein.

It is the object of the present invention to provide a novel and improved ring adapted for manufacture at low cost and of the type having a stepped sealed joint wherein the seal is effective throughout the full length of the joint and accurately milled surfaces permit no side play or distortion and eliminate compression leaks between the parts of the ring which are in bearing contact.

More particularly stated, it is my purpose to provide a ring in which the free ends have staggered tongues with rectilinear margins substantially throughout their length, the surfaces of which have a material and substantial length of contact with each other and with adjacent complementary surfaces of opposing free ends of the ring, whereby to make an effective seal.

In the drawings.

Like parts are identified by the same reference characters throughout the several views.

Figure 1:
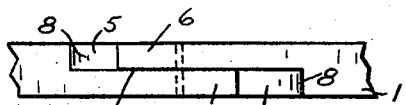
Figure 1 is a fragmental plan view of a portion of the ring illustrated in Figure 2.

The ring 1 is preferably manufactured by the method disclosed and claimed in the above identified companion application of which this is a division. The transverse cut made at 3 through an annulus, of cast iron or other suitably resilient metal, leaves a split ring having free ends. It is immaterial whether this cut is made before or after a transverse slot 2 is milled across the inner periphery of the ring in a position such that it is symmetrical with reference to the radial plane in which cut 3 is made. Thereafter, the ends of the ring being preferably deflected either laterally or radially, a standard milling cutter of any desired diameter may be brought into contact individually with each of the free ends of the ring in turn and may be adjusted circumferentially of the ring and subtsantially parallel to its faces or side margins to remove from opposite margins of the respective ends approximately one-half of the width of each of the extreme ends and a corresponding depth and width of material from the lateral portions of the ring adjacent its extreme ends.

In stating that the cutter is moved circumferentially, I mean merely that the direction of movement is generally circumferential. If the direction of the cutter were purely circumferential, the surfaces 4 and 5 would be curved arcuately and concentric with the ring itself. It is, however, immaterial for practical purposes whether the surfaces 4 and 5 are concentric with the axis of the ring or are made by linear movement of the cutter to lie in planes defined by chords of the ring. The deviation of the chord from the arc which it subtends is minute in the circumferential distance for which the cut extends. When, therefore, I speak of adjusting the milling cutter circumferentially of the ring, I will be understood to mean merely that the general direction is circumferential as distinguished from a transverse or a radial cut. When the cutter reaches its extreme position it is withdrawn from the work leaving the outwardly curving surfaces 8 which represent the arc of the periphery of the cutter used.

Figure 2:
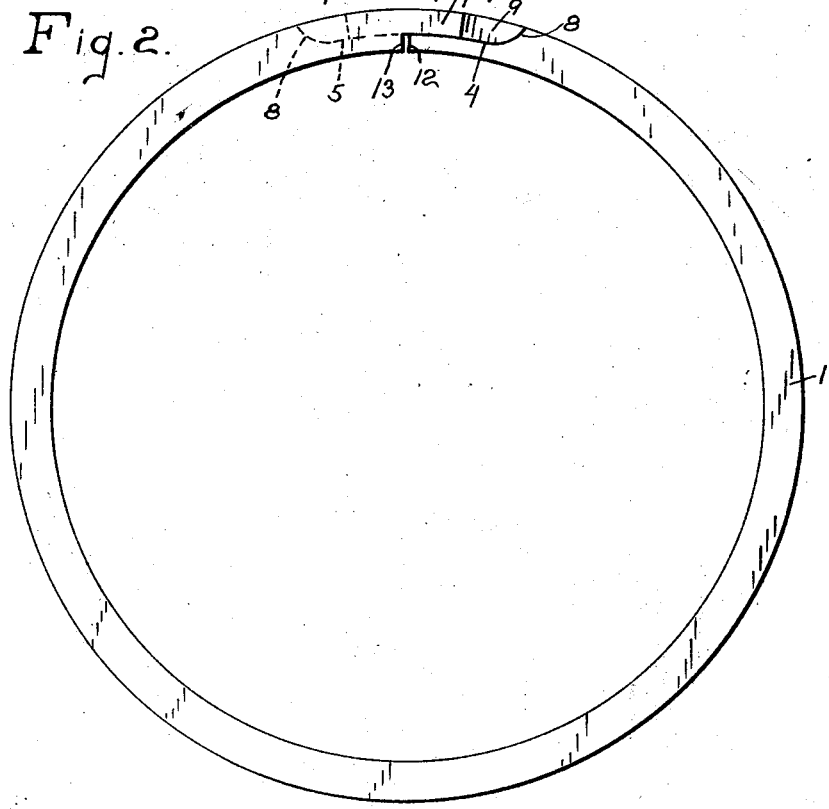
Figure 2 is a side elevation of a split packing ring having a stepped sealed joint embodying this invention.
Figure 3:
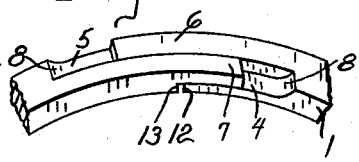
Figure 3 is a detail view in perspective of the stepped sealed joint between the free ends of the ring shown in Figure 2 when such ring is contracted as it appears in Figure 2.
Figure 4:
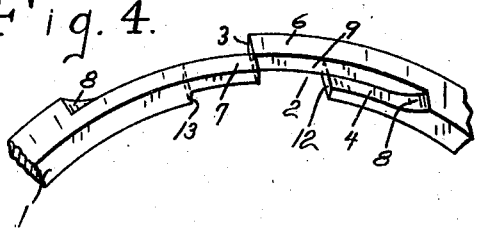
Figure 4 is a view similar to Figure 3 showing the ends of the ring as they appear when the ring is expanded.

When this cut is completed upon opposite sides of the center lines in the two free ends of the ring, it will be found that there remain staggered tongues 6 and 7, the side walls 9 of which are in a common plane and adapted for face contact and, being formed by the outer peripheral portions of the milling cutter used, are accurately surfaced for close fitting abutment. The faces 9 on the inner side of arms 7 are located in the central plane of the ring normal to its axis and are obviously extended to full depth of the cut in the portion of the ring adjacent its free ends so as to be contiguous to the surfaces 4 and 5. The under surfaces of tongues 6 and 7 are machined during the making of the transverse cut at 2 and are complementary to surfaces 4 and 5. It will be obvious, therefore, that when the shoulders 12 and 13 are brought into proximity, by contraction of the ring as shown in Figures 1 to 3 inclusive, each of tongues 6 and 7 will overlap complementary surfaces formed in the opposite end of the ring to substantially the extent of the entire length of the tongue.

The effectiveness of a seal produced by a piston ring is in a general way proportionate to the degree of overlap in the stepped sealed joint between its free ends. It is, therefore, of great importance that the tongues 6 and 7 should have rectilinear margins whereby to fit closely to surfaces 4, 5 and 9 substantially throughout the length of each tongue. An equivalent degree of overlap cannot otherwise be obtained with a given degree of ring contraction following the making of the cut at 3. Since the degree of permissible contraction is limited by the amount of expanding pressure which it is permissible for the ring to exert upon the wall of a confining cylinder, it will be obvious that it is desirable to extend the effective degree of overlap between the ends of the piston as far as possible for a given degree of contraction.

It will be noted, furthermore, that the rectilinear tongues whereby the overlap between the ends of my improved ring is made effective, are located in the outer periphery of the ring where they may operate to present a substantial continuous peripheral packing to resist the passage of gases along a piston with which this ring is associated. If the tongues were on the inside and the shoulders 12 and 13 were in the outer periphery of the ring, the ring would obviously not be gas tight and there would be no object for providing rectilinear margins on the tongues 6 and 7.

It has been found in actual practice that after actual and protracted use of rings embodying this invention in the cylinders of internal combustion engines, there is no carbon deposit between tongues 6 and 7 or between such tongues and the web surfaces 4 and 5, but that such surfaces are bright and polished showing a perfect gas tight seating. The tongues 6 and 7, being on the outer peripheral side of the ring, receive the full pressure of gases in internal combustion engines, or the like, to hold them in a continuous side to side contact.

It will be noted that the drawings illustrate tongues 6 and 7 as being of materially greater thickness than the web portions of the ring underlying the surfaces 4 and 5. This proportion of the parts is not necessary but is preferred for the reason that the web portions have inherently greater strength than a corresponding thickness of tongue and, furthermore, the outer peripheral surfaces of the tongues are more subject to wear than any other part of the ring. Also it is desirable to maintain the stepped sealed overlapping joint between all portions of the ring which are or may be exposed exteriorly of a piston groove when the ring is in use. These reasons have led to the selection of the illustrated design and proportion of parts although, as above indicated, I do not desire to limit myself to such proportion except to the extent hereinafter claimed.

From the foregoing remarks it will be seen that by providing a split ring, having a stepped sealed joint and with rectilinear staggered tongues in its outer periphery, I have satisfied the objects of the invention as above specified and have disclosed a ring in which the entire length of each of the tongues at its ends is available for sealing purposes and is operatively in gas tight contact throughout its length with complementary surfaces on the opposite end of the ring. Even though such a ring becomes worn and expands during use until merely the extreme ends of tongues 6 and 7 overlap surfaces 4 and 5, the seal will be preserved due to the fact that the tongues have rectilinear margins to their extreme ends.

I claim:

A piston ring comprising a split ring having square cut transverse shoulders adjacent its ends on its inner periphery and provided in its outer periphery with marginal recesses substantially square cut in cross section and disposed on opposite sides of their respective ends with substantially plane radially outer bearing surfaces continuous to said shoulders, and tongues projecting beyond the shoulders at the end of the ring and formed with laterally inner bearing surfaces complementary to each other and radially inner surfaces complementary to the radially outer surfaces of said recesses, the ends of said tongues being substantially square cut and their radially inner bearing surfaces being continuous substantially to their respective ends, whereby said tongues are adapted to maintain an effective seal in any position of overlap.

RAY GROVER.